United States Patent
Takanohashi et al.

(10) Patent No.: US 11,352,504 B2
(45) Date of Patent: Jun. 7, 2022

(54) METAL PARTICLE ANNULAR STRUCTURE, INSULATOR-COATED METAL PARTICLE ANNULAR STRUCTURE, AND COMPOSITION

(71) Applicant: ASAHI KASEI KABUSHIKI KAISHA, Tokyo (JP)

(72) Inventors: Hiroaki Takanohashi, Tokyo (JP); Akira Nakabayashi, Tokyo (JP); Naoya Tochishita, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/646,569

(22) PCT Filed: Sep. 14, 2018

(86) PCT No.: PCT/JP2018/034299
§ 371 (c)(1),
(2) Date: Mar. 12, 2020

(87) PCT Pub. No.: WO2019/054508
PCT Pub. Date: Mar. 21, 2019

(65) Prior Publication Data
US 2020/0263039 A1 Aug. 20, 2020

(30) Foreign Application Priority Data
Sep. 15, 2017 (JP) .............................. JP2017-177300

(51) Int. Cl.
*C09C 1/30* (2006.01)
*C08K 3/36* (2006.01)
(Continued)

(52) U.S. Cl.
CPC .............. *C09C 1/3054* (2013.01); *C08K 3/36* (2013.01); *C08K 9/02* (2013.01); *C08K 13/06* (2013.01);
(Continued)

(58) Field of Classification Search
CPC .......... C09C 1/3054; C08K 3/36; C08K 9/02; C08K 13/06; C08K 2201/011; C01P 2004/64; C01P 2006/60
(Continued)

(56) References Cited

U.S. PATENT DOCUMENTS

2005/0069648 A1  3/2005 Maruyama
2007/0243401 A1  10/2007 Hirata et al.
(Continued)

FOREIGN PATENT DOCUMENTS

CN  1845806 A  10/2006
CN  1980761 A  6/2007
(Continued)

OTHER PUBLICATIONS

Yabu, "Bottom-up Approach to Creating Three-Dimensional Nanoring Arrays Composed of Au Nanoparticles", Langmuir, 2013, 29, 1005-1009. (Year: 2013).*
(Continued)

*Primary Examiner* — Ling Siu Choi
*Assistant Examiner* — Ronald Grinsted
(74) *Attorney, Agent, or Firm* — Kenja IP Law PC

(57) ABSTRACT

The present disclosure is directed to provide a novel metal particle annular structure capable of functioning as a metamaterial in three dimensions. The metal particle annular structure (C) of the present disclosure includes an insulative support (B) having a particle connecting structure including
(Continued)

a plurality of particles connecting to one another, and a plurality of metal particles (A) arranged annularly around the insulative support (B).

23 Claims, 4 Drawing Sheets

(51) Int. Cl.
*C08K 9/02* (2006.01)
*C08K 13/06* (2006.01)

(52) U.S. Cl.
CPC ...... *C01P 2004/64* (2013.01); *C01P 2006/60* (2013.01); *C08K 2201/011* (2013.01)

(58) Field of Classification Search
USPC ........................................................ 252/582
See application file for complete search history.

(56) References Cited

U.S. PATENT DOCUMENTS

| | | |
|---|---|---|
| 2009/0061170 A1 | 3/2009 | Fujikawa et al. |
| 2010/0118412 A1 | 5/2010 | Sanada |
| 2010/0267885 A1 | 10/2010 | Harimoto |
| 2010/0316794 A1 | 12/2010 | Miyakawa et al. |
| 2011/0178210 A1 | 7/2011 | Tiquet |
| 2011/0217544 A1 | 9/2011 | Young et al. |
| 2012/0041150 A1 | 2/2012 | Yabu et al. |
| 2012/0141780 A1 | 6/2012 | Konno et al. |
| 2012/0183775 A1 | 7/2012 | Shinba et al. |
| 2013/0011616 A1 | 1/2013 | Matsumura et al. |
| 2013/0141190 A1 | 6/2013 | Kitaoka et al. |
| 2014/0138570 A1 | 5/2014 | Otsuka et al. |
| 2014/0151733 A1 | 6/2014 | Koike et al. |
| 2014/0371353 A1 | 12/2014 | Mitchell et al. |
| 2016/0131585 A1 | 5/2016 | Xiong et al. |
| 2016/0190704 A1 | 6/2016 | Celik |
| 2017/0009036 A1 | 1/2017 | Xie et al. |
| 2017/0205329 A1 | 7/2017 | Astier et al. |

FOREIGN PATENT DOCUMENTS

| | | |
|---|---|---|
| CN | 101147210 A | 3/2008 |
| CN | 101821339 A | 9/2010 |
| CN | 102112530 A | 6/2011 |
| CN | 102186643 A | 9/2011 |
| CN | 102393865 A | 3/2012 |
| CN | 102471085 A | 5/2012 |
| CN | 102574934 A | 7/2012 |
| CN | 102822249 A | 12/2012 |
| CN | 102985857 A | 3/2013 |
| CN | 103030728 A | 4/2013 |
| CN | 105493286 A | 4/2016 |
| CN | 106457748 A | 2/2017 |
| CN | 107076763 A | 8/2017 |
| EP | 1975656 A1 | 10/2008 |
| EP | 2879134 A1 | 6/2015 |
| JP | 2008252293 A | 10/2008 |
| JP | 2010082731 A | 4/2010 |
| JP | 2010185023 A | 8/2010 |
| JP | 2012500865 A | 1/2012 |
| JP | 2013005044 A | 1/2013 |
| JP | 2013195236 A | 9/2013 |
| JP | 2014103266 A | 6/2014 |
| JP | 2017154159 A | 9/2017 |
| WO | 03051562 A1 | 6/2003 |
| WO | 2012176728 A1 | 12/2012 |
| WO | 2013039180 A1 | 3/2013 |
| WO | 2015054493 A1 | 4/2015 |

OTHER PUBLICATIONS

Mar. 17, 2020, International Preliminary Report on Patentability issued in the International Patent Application No. PCT/JP2018/034299.

Gu Chao et al., A metamaterial absorber based on electromagnetic resonances of metal structures, May 30, 2015.

Atsushi Ishikawa et al., Negative Magnetic Permeability in the Visible Light Region, Physical Review Letters, Dec. 2, 2005, pp. 237401-1 to 237401-4, vol. 95.

Che-Chin Chen et al., Uniaxial-isotropic Metamaterials by Three-Dimensional Split-Ring Resonators, Advanced Optical Materials, Jan. 2015, pp. 44 to 48, vol. 3, Issue 1.

Na Liu et al., Three-dimensional photonic metamaterials at optical frequencies, nature materials, Jan. 2008, pp. 31 to 37, vol. 7.

Nov. 27, 2018, International Search Report issued in the International Patent Application No. PCT/JP2018/034299.

Takuo Tanaka, Self-organized fabrication of optical metamaterials using DNA or magnetic field, Optoronics, Aug. 10, 2014, pp. 60 to 64, No. 392, ISSN: 0286-9659 with a partial English translation.

Hiroshi Yabu, Bottom-Up Approach to Creating Three-Dimensional Nanoring Arrays Composed of Au Nanoparticles, Langmuir, 2013, pp. 1005-1009, vol. 29.

May 15, 2020, the Supplementary European Search Report issued by the European Patent Office in the corresponding European Patent Application No. 18857014.7.

Norbert Nagy et al., Identification of Dewetting Stages and Preparation of Single Chain Gold Nanoparticle Rings by Colloidal Lithography, Langmuir, 2016, pp. 963-971, vol. 32.

Han Jian-Ning et al., Acoustic multipolar local effects of metamaterial with annular columnar structures, Journal of Measurement Science and Instrumentation, Dec. 2017, pp. 307-313, vol. 8, No. 4.

Wang Jia-Fu et al., Planar left-handed metamaterials based on double split-ring resonator pairs, Acta Physica Sinica, May 2009, pp. 3224-3229, vol. 58, No. 5.

\* cited by examiner

METAL PARTICLE ANNULAR STRUCTURE, INSULATOR-COATED METAL PARTICLE ANNULAR STRUCTURE, AND COMPOSITION

TECHNICAL FIELD

The present disclosure relates to a metal particle annular structure, an insulator-coated metal particle annular structure, and a composition.

BACKGROUND

Metamaterials have been recently proposed, which are artificial materials formed of a metal, a dielectric, a magnetic substance, or the like, having a structure sized to be equal to or smaller than the wavelength of incident light to thereby artificially modify the dielectric constant and the magnetic permeability of the medium. Here, the term "metamaterial" refers to an artificial substance engineered to exhibit behaviors responsive to electromagnetic waves including light, in a manner not found in naturally occurring materials. Metamaterials have properties not achievable by conventional materials, such as bending incident light so as to propagate in a direction of a negative refractive index, for example. Thus, they have been expected as promising materials for expanding the capability of artificially engineering light propagation, and extensive research and development efforts therefore have been made.

Such metamaterials are artificial materials comprising, integrated therein, a large number of micro- to nanometer-scale resonator antenna elements responsive to electromagnetic waves including light, and are characterized by their ability to enabling artificial modification of the optical properties of the materials by appropriately designing the resonator antenna elements.

In a typical metamaterial, the propagation characteristics of electromagnetic waves such as light rely on a large number of metal microresonators embedded in the medium. Such metal microresonators have a size of about one fourth to one tenth of the wavelength of electromagnetic waves operated by the metal microresonators as a metamaterial (hereinafter, the wavelength is referred to as "operating wavelength"). For example, in operating wavelengths shorter than the wavelength of microwaves, the sizes of fine structures of metal microresonators are required to have sizes on the order of micrometers or nanometers. The difficulty of micromachining techniques for fabricating metal microresonators increases sharply as the size requirements become stricter. Thus, the operating wavelengths of most of metamaterials are limited to wavelengths of millimeter-scale microwaves or longer. Most of the metamaterials reported on publications have operating wavelengths in such wavelength ranges.

In the meantime, with regard to metal microresonators for a metamaterial, Tanaka et al. conducted calculations and demonstrated that split-ring resonator structures (hereinafter referred to as "SRR structures") are effective as fundamental resonator structures for a metamaterial (for example, see NPD 1). An SRR structure is made of a conductor having an annular conductive path provided with gaps or split portions such as notches, for example. In order to verify this finding on the calculation results in actual metamaterials, how SRR structures can be fabricated also presents a challenge.

Micromachining techniques for metamaterials, including techniques for fabricating SRR structures, can be classified into top-down and bottom-up approaches.

The top-down approaches fabricate fine structures with high accuracy by means of processes, such as an exposure patterning, all of which are precisely controlled by humans, as exemplified by optical lithography. One top-down approach has been proposed and established which includes repeating a series of steps of resist coating, electron-beam lithography, vapor deposition of a thin metal film, and lift-off (see NPD 2, for example).

On the other hand, the bottom-up approaches utilize self-assembled formations driven by the properties of materials, such as formation of snow crystals by water molecules assembling together and pre-programmed formation of structures of organisms. Although bottom-up approaches enable high-speed formations in a larger amount at lower cost, there are restrictions on the accuracy and freedom degree of shapes to formed. One technique for producing a metamaterial structure with a bottom-up approach has been proposed, in which various regular structures are formed through application of an external magnetic field to fine particles dispersed in a fluid. Paramagnetic or ferromagnetic core components and diamagnetic peripheral components smaller than the core components assemble into fine structures, each of which comprises a core component and several peripheral components arranged around the vicinity of the equator of the core component. These structures are made to function as microresonators for a metamaterial as described above (see PTL 1, for example).

There also have been proposed techniques of hybrids of top-down and bottom-up approaches. A polymethyl methacrylate (PMMA) resist material is applied on a silicon substrate and is patterned by electron beam lithography. A thin metal layer is then deposited on the substrate by vacuum evaporation, and the remaining PMMA film is removed to form metal ribbons. Silicon of the substrate is then dry etched, which causes the metal ribbons to warp to thereby form self-standing ring structures that stand perpendicularly to the surface of the silicon substrate. These annular structures are made to function as a single resonator antenna constituting a metamaterial (see NPD 3, for example).

CITATION LIST

Patent Literature

PTL 1: JP2013005044A

Non-Patent Literature

NPL 1: Ishikawa, A., Tanaka, T., & Kawata, S. (2005). Negative magnetic permeability in the visible light region. *Physical review letters*, 95(23), 237401.
NPL 2: Liu, N., Guo, H., Fu, L., Kaiser, S., Schweizer, H., & Giessen, H. (2008). Three-dimensional photonic metamaterials at optical frequencies. *Nature materials*, 7(1), 31-37.
NPL 3: Chen, C. C., Ishikawa, A., Tang, Y. H., Shiao, M. H., Tsai, D. P., & Tanaka, T. (2015). Uniaxial-isotropic Metamaterials by Three-Dimensional Split-Ring Resonators. *Advanced Optical Materials*, 3(1), 44-48.

SUMMARY

Technical Problem

Conventionally, no technique for manufacturing metamaterials has been proposed which is capable of manufacturing micrometer- to nanometer-scale resonator structures with a wider area or a larger capacity at once and with a greater degree of design freedom. In particular, no technique have been devised yet which can form nanometer-scale metamaterials operating in short wavelength regions such as infrared light, visible light, and ultraviolet light regions, in large quantities or at once.

For example, the technique disclosed in the above-mentioned NPD 2 employs conventional semiconductor micromachining techniques to fabricate a three-dimensional structure by stacking two-dimensional structures layer by layer. This technique has a drawback that structural errors are likely to accumulate during manufacturing of a three-dimensional structure. Further, since manufacturing of such structures is time-consuming, metamaterial structures having a large area and a large capacity are difficult to be fabricated.

In addition, the technique disclosed in PTL 1 requires application of a magnetic field for fabricating fine structures functioning as resonators, and thus requires a special manufacturing apparatus. In addition, since the magnetic field is applied only in one direction, the direction in which the resonators are oriented is limited to a certain direction. Thus, the resonators have strong anisotropy in that they manifest the functionality as a metamaterial responsive to electromagnetic waves in a certain direction, but the functionality is lost when the direction of incident is changed. Moreover, this approach is only applicable to metamaterials in sub-micron order, and thus cannot provide metamaterials on the nanometer scale which operate on visible light or ultraviolet light.

Furthermore, although the technique disclosed in NPD 3 can be used to form three-dimensional structures, multiple semiconductor micromachining techniques are required. Hence, like the approach disclosed in NPD 1, it experiences a drawback that manufacturing processes are time-consuming, making manufacturing of metamaterial structures with large areas and larger capacities difficult.

The present disclosure is directed to provide a metal particle annular structure and an insulator-coated metal particle annular structure as nanometer-scale resonator structures which are novel and are capable of functioning as a metamaterial in three dimensions, and a composition including the same.

Solution to Problem

We have conducted intensive studies to solve the above-mentioned issues, and have found that the above-mentioned issues can be solved by an approach to control the structures of metal particles, which is completely different from the above-mentioned approaches, thereby completing the present disclosure.

Specifically, the present disclosure provides the following:

(1) A metal particle annular structure (C) comprising:
an insulative support (B) having a particle connecting structure comprising a plurality of particles connecting to one another; and
a plurality of metal particles (A) arranged annularly around the insulative support (B).

(2) The metal particle annular structure (C) according to any one of aforementioned (1), wherein the particle connecting structure has an structure in which a first insulative particle (a) and a second insulative particle (b) are alternately connected in a chain, and the plurality of metal particles (A) are arranged around the first insulative particle (a) or the second insulative particle (b).

(3) The metal particle annular structure (C) according to any one of aforementioned (2), wherein the first insulative particle (a) is an anionic particle, and the second insulative particle (b) is a cationic particle.

(4) The metal particle annular structure (C) according to any one of aforementioned (1) to (3), wherein a number of the plurality of metal particles (A) is 3 or more and 30 or less.

(5) The metal particle annular structure (C) according to any one of aforementioned (1) to (4), wherein the plurality of metal particles (A) have an average diameter of 5 nm or more and 200 nm or less.

(6) The metal particle annular structure (C) according to any one of aforementioned (1) to (5), wherein the metal particles (A) are arranged so as to form an annulus having an outer diameter of 15 nm to 1000 nm.

(7) The metal particle annular structure (C) according to any one of aforementioned (1) to (6), wherein the metal particles (A) are of a conductor selected from the group consisting of gold, silver, copper, lead, zinc, tin, iron, and aluminum.

(8) The metal particle annular structure (C) according to any one of aforementioned (1) to (7), wherein the metal particles (A) are core-shell metal particles (A-s), a surface of each core-shell metal particles (A-s) being coated with a first insulating material.

(9) The metal particle annular structure (C) according to any one of aforementioned (8), wherein the plurality of metal particles (A) have an average thickness of the first insulating material of 1 nm or more and 80 nm or less.

(10) The metal particle annular structure (C) according to any one of aforementioned (8) or (9), wherein the first insulating material is at least one selected from the group consisting of a metal oxide, a metal nitride, a metal sulfide, a phosphate salt, and an organic compound.

(11) An insulator-coated metal particle annular structure (F) comprising:
the metal particle annular structure (C) according to any one of aforementioned (1) to (10) coated with a second insulating material.

(12) A composition comprising:
a plurality of the metal particle annular structures (C) according to any one of aforementioned (1) to (10) and/or a plurality of the insulator-coated metal particle annular structures (F) according to (11); and water and/or an organic solvent.

(13) A composition (E) comprising:
a plurality of the metal particle annular structures (C) according to any one of aforementioned (1) to (10) and/or a plurality of the insulator-coated metal particle annular structures (F) according to (11); and a resin (D).

Advantageous Effect

In accordance with the present disclosure, provided are a metal particle annular structure and an insulator-coated metal particle annular structure as nanometer-scale resonator structures which are novel and are capable of functioning as a metamaterial in three dimensions, and a composition including the same.

BRIEF DESCRIPTION OF THE DRAWINGS

In the accompanying drawings:
FIG. 1 is an example of a schematic diagram of the metal particle annular structure according to the present disclosure, wherein the metal particle annular structure comprises an insulative support having a three-particle connecting structure comprising two anionic particles 1a and one cationic particle 1b interposed between the two anionic particles 1a, and six negatively charged metal particles 1A arranged annularly on the surface of the cationic particle 1b in the insulative support.

FIG. 2 is an example of a schematic diagram of the metal particle annular structure according to the present disclosure, wherein the metal particle annular structure comprises an insulative support having a five-particle connecting structure comprising three anionic particles 2a and two cationic particles 2b each interposed between two adjacent anionic particles of the three anionic particles 2a, and six negatively charged metal particles 2A arranged annularly on the surface of each of the cationic particles 2b in the insulative support.

FIG. 3 is a diagram illustrating the structure of six negatively charged metal particles A (1A or 2A) arranged annularly on the surface of a cationic particle b (1b or 2b) in FIGS. 1 and 2.

DETAILED DESCRIPTION

Figure 1:
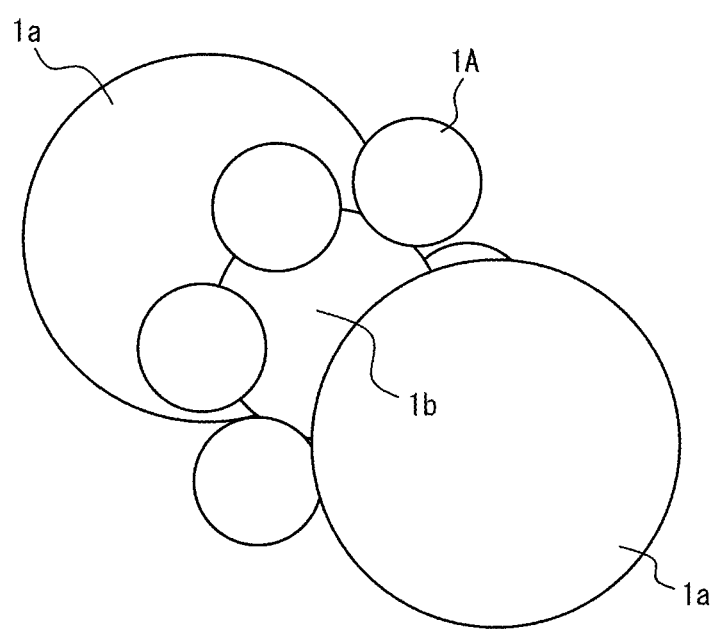
FIG. 1 is a diagram illustrating an example of a metal particle annular structure according to the present disclosure.

A metal particle annular structure (C) of the present disclosure includes a plurality of metal particles (A) and an insulative support (B) having a particle connecting structure comprising a plurality of particles connecting to one another, wherein the metal particles (A) are arranged annularly around the insulative support (B).

(Metal Particles (A))

The metal particles (A) of the present disclosure are of at least one conductor selected from the group consisting of gold, silver, copper, lead, zinc, tin, iron, and aluminum. From the viewpoint of achieving manifestation of characteristics of a metamaterial of the metal particle annular structure (C) comprising the metal particles (A), the conductor is preferably of at least one selected from gold, silver, and copper.

The metal particles (A) preferably have an average diameter of 5 nm or more and 200 nm or less. An average diameter of 5 nm or more permits the metal particle annular structure (C) comprising the metal particles (A) to manifest characteristics of a metamaterial. In addition, an average diameter of 200 nm or less increases the transparency of the metal particle annular structure (C) comprising the metal particles (A), which expands its industrial applicability. The average diameter is more preferably 10 nm or more and 100 nm or less, even more preferably 15 nm or more and 80 nm or less. The average diameter of the metal particles (A) can be determined from SEM images, or by dynamic light scattering, or the like.

The metal particles (A) in the present disclosure are preferably core-shell metal particles (A-s) coated with an insulating material (first insulating material). As used herein, the term "core-shell metal particle" refers to a structure in which the surface of a metal particle (A) as a core (nucleus) is coated with the first insulating material as a shell (outer skin). Such core-shell metal particles (A-s) make the distances between the metal particles (A) to be more controllable, which facilitates manifestation of the material characteristics of a metamaterial as an excellent resonator.

The core-shell metal particles (A-s) preferably have an average thickness of the first insulating material of 1 nm or more and 80 nm or less. The first insulating material with an average thickness of 1 nm or more can prevent the metal particles (A) from directly contacting with each other. Direct contacts of the metal particles (A) are not desirable because the metal particle annular structure (C) comprising the metal particles (A) becomes less likely to manifest the metamaterial characteristics. On the other hand, the first insulating material with an average thickness of 80 nm or less permits the metal particle annular structure (C) comprising the metal particles (A) to manifest favorable metamaterial characteristics. The thickness is more preferably 2 nm or more and 50 nm or less, even more preferably 2 nm or more and 20 nm or less.

In the present disclosure, the first insulating material is preferably at least one selected from the group consisting of a metal oxide, a metal nitride, a metal sulfide, a phosphate salt, and an organic compound. Here, the metal oxide, the metal nitride, or the metal sulfide may have an organic group.

In cases where the first insulating material is a metal oxide or a phosphate salt in the present disclosure, the metal particles (A) are prevented from contacting with each other in a stable and reliable manner. Here, the metal oxide is preferably at least one selected from silicon oxide, titanium oxide, zinc oxide, zirconium oxide, iron oxide, niobium oxide, cerium oxide, and nickel oxide. Of these, silicon oxide is preferable because it can be coated on metal particles (A) relatively easily to thereby produce core-shell metal particles (the reaction is highly controllable). As a phosphate salt, porous calcium phosphate or the like can be suitably used.

The organic compound which can be used as the first insulating material may be a low molecular weight compound having a molecular weight of 1000 or less or a high molecular weight compound having a number average molecular weight of 1000 or more. In this case, an organic compound capable of having an interaction with the metal particles (A) is preferable because the metal particles (A) are prevented from contacting with each other in a stable and reliable manner. Examples of the organic compound capable of having an interaction with the metal particles (A) include silane coupling agents, silicone resins, urethane resins, fluorine resins, silicone-acrylic resins, polyethylene glycols, block copolymers of polyethylene glycols and polypropylene glycols, and polyvinyl alcohols. As the silane coupling agents as mentioned above, silane coupling agents having an amino group, a thiol group, an epoxy group, a (meth) acryloyl group, a phenyl group, or the like is preferably selected because they are capable of having a strong interaction with the metal particles (A).

In cases where the first insulating material for the shell is a metal oxide, a metal nitride, a metal sulfide, or a phosphate salt, the core-shell metal particles (A-s) in the present disclosure can be preferably prepared through a reaction of a precursor of the first insulating material for the shell (e.g., a metal complex salt or alkoxy metal) in the presence of metal particles (A).

Alternatively, in cases where the first insulating material for the shell is an organic compound, the core-shell metal particles (A-s) in the present disclosure can be preferably prepared through a reaction of a precursor of the first insulating material (e.g., a vinyl monomer, a condensable monomer, or an addition polymerizable monomer, etc.) in the presence of metal particles (A), or by inducing deposition of the organic compound on the surfaces of the metal particles (A) utilizing the difference in solubility, for example.

(Insulating Support (B) Having Particle Connecting Structure)

The insulative support (B) of the present disclosure having a particle connecting structure is composed of insulative particles connecting one another through a Coulomb interaction, a van der Waals interaction, a covalent bond, a hydrogen bond, or the like. For example, as an example where the particle connecting structure is formed by a Coulomb interaction, a plurality of insulative particles are anionic particles and cationic particles, which are made to connect one another. As used herein, the terms "connecting" and "connect" refer to the situation where particles are bonded to one another through a Coulomb interaction, a van der Waals interaction, a covalent bond, a hydrogen bond, or the like.

In the present disclosure, the insulative particles are made of at least one selected from the group consisting of a metal oxide, a metal nitride, a metal sulfide, and an organic compound. Here, the metal oxide, the metal nitride, or the metal sulfide may have an organic group.

Examples of the metal oxide include silicon oxide, titanium oxide, zinc oxide, zirconium oxide, iron oxide, niobium oxide, cerium oxide, and nickel oxide. Examples of the metal of the metal nitride and the metal sulfide include iron, cobalt, nickel, lead, zinc, and copper.

A preferred organic compound that can be used for the insulative particles is a polymer compound having a number-average molecular weight of 1000 or more. Any of synthetic and natural resins can be used, including acrylic resins, silicone resins, urethane resins, fluorine resins, silicone-acrylic resins, epoxy resins, alkyd resins, vinyl resins, unsaturated polyester resins, and chlorinated rubbers.

The insulative particles preferably have an average diameter of 5 nm or more and 600 nm or less. The average diameter is more preferably 10 nm or more and 200 nm or less from the viewpoint of the stability of the shape, and is preferably 10 nm or more and 100 nm or less from the viewpoint of the optical property (transparency).

The insulative support (B) having a particle connecting structure of the present disclosure is preferably composed of 2 or more and 30 or less spherical particles from the viewpoint of achieving a stable annular arrangement of the metal particles (A). Further, from the viewpoint of the optical property (transparency), the insulative support (B) is preferably composed of 3 or more and 10 or less spherical particles.

For composing a particle connecting structure from three spherical particles by Coulomb interactions in the present disclosure, the particle connecting structure can be composed of two anionic particles $1a$ and one cationic particle $1b$ interposed between the two anionic particles $1a$, as illustrated in FIG. 1. In this case, each of the metal particles 1A is negatively charged to be an anionic particle, such that the metal particles are arranged on the surface of the cationic particle $1b$.

For composing a particle connecting structure of an alternative embodiment from three spherical particles by a Coulomb interaction, the particle connecting structure can be composed of two cationic particles $1b$ and one anionic particle $1a$ interposed between the two cationic particles $1b$. In this case, each of the metal particles 1A is positively charged to be a cationic particle, such that the multiple metal particles 1A are arranged on the surface of the anionic particle $1a$.

The anionic particle $1a$ is not particularly limited as long as it is an anionic particle having a negative charge, and may be a negatively-charged metal oxide, metal nitride, metal sulfide, or organic compound. An anionic metal oxide particle, a polymer latex containing an anionic group, or the like can be preferably used from the viewpoints of ease of control on particle sizes and costs. Of these, an anionic silica particle and an anionic polymer latex are preferably used.

The cationic particle $1b$ is not particularly limited as long as it is a cationic particle having a positive charge, and may be a particle of a metal oxide, a metal nitride, a metal sulfide, or an organic compound, of which surface has been cationized, for example. A cationic metal oxide particle, a polymer latex containing a cationic group, or the like can be preferably used from the viewpoints of ease of control on particle sizes and costs. Of these, a cationic silica fine particle and a cationic polymer latex are preferably used from the viewpoints of ease of control on particle sizes and costs.

(Entire Structure of Metal Particle Annular Structure (C))

In the present disclosure, the number of the metal particles (A) arranged annularly around one insulative particle in the insulative support (B) having a particle connecting structure is preferably 3 or more and 30 or less. Having three or more metal particles (A) permits peculiar metamaterial characteristics (optical effects) to be manifested. Having the metal particles (A) exceeding 30 is, in contrast, undesirable since a metal particle annular structure (C) becomes larger, resulted in a reduced transparency. The number of the metal particles (A) is more preferably 3 or more and 20 or less, even more preferably 4 or more and 10 or less.

Note that the terms "annular" and "annulus" are not particularly limited as long as functions as a metamaterial are manifested, and the terms encompass circular and elliptic shapes, and circumferential shapes with concavities and convexities etc.

FIG. 1 is an example of a schematic diagram of the metal particle annular structure according to the present disclosure, wherein the metal particle annular structure comprises an insulative support having a three-particle connecting structure comprising two anionic particles $1a$ and one cationic particle $1b$ interposed between the two anionic particles $1a$, and six negatively charged metal particles 1A arranged annularly on the surface of the cationic particle $1b$ in the insulative support.

Figure 2:
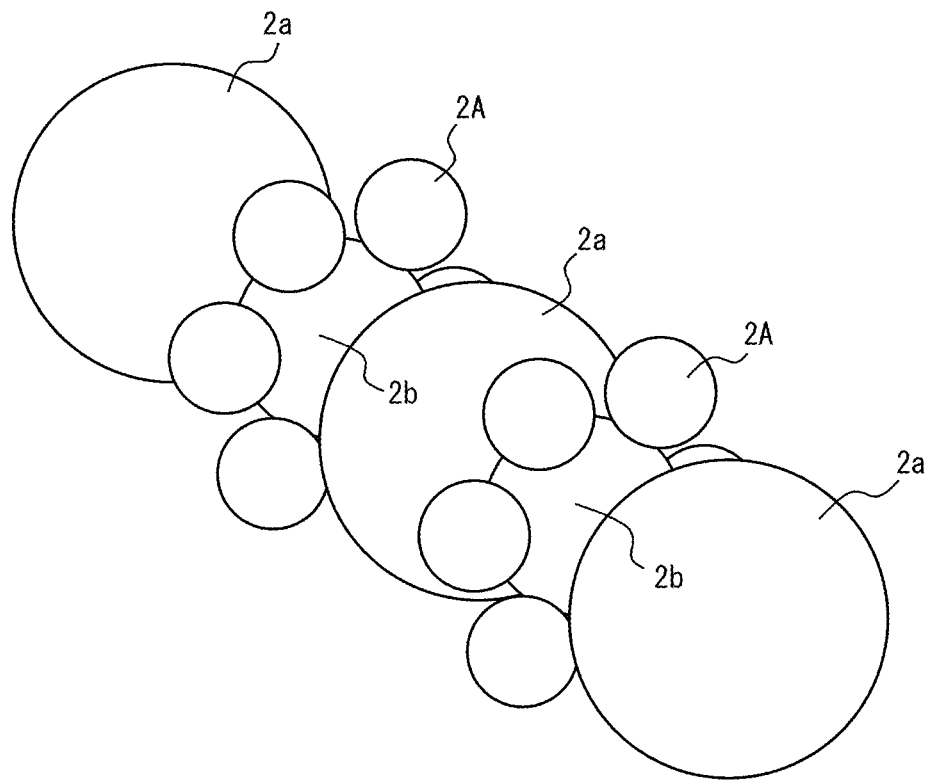
FIG. 2 is a diagram illustrating another example of a metal particle annular structure according to the present disclosure.

FIG. 2 is an example of another schematic diagram of the metal particle annular structure according to the present disclosure, wherein the metal particle annular structure comprises an insulative support having a five-particle connecting structure comprising three anionic particles $2a$ and two cationic particles $2b$ each interposed between two adjacent anionic particles of the three anionic particles $2a$, and six negatively charged metal particles 2A arranged annularly on the surface of each of the cationic particles $2b$ in the insulative support.

Figure 3:
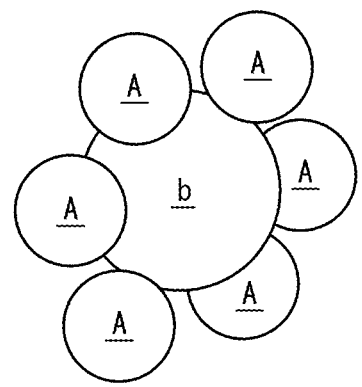
FIG. 3 is a diagram illustrating an example of a part of a metal particle annular structure according to the present disclosure.

FIG. 3 is a schematic view illustrating the structure of six negatively charged metal particles A arranged annularly on the surface of the cationic particles b in FIGS. 1 and 2.

In the metal particle annular structure (C) of the present embodiment, preferably, the metal particles (A) are arranged annularly without contacting with each other. For example, core-shell metal particles having their surfaces coated with an insulating material are arranged such that the insulating material are in contact with each other so as to arrange the metal particles (A) having the insulating material interposed therebetween. The metal particles (A) not in contact with each other permit the metal particle annular structure (C) of the present embodiment to strongly manifest the functionality as a metamaterial.

The intervals between adjacent metal particles (A) are preferably 0.1 to 200 nm, more preferably 1 to 100 nm, and even more preferably 5 to 50 nm, from the viewpoint of manifestation of a further excellent functionality as a metamaterial. Preferably, an interval between at least one pair of adjacent metal particles (A) included in the metal particle annular structure (C) of the present embodiment is within the above range. More preferably, the interval between every pair of adjacent metal particles is within the above range.

It is to be noted that the term "interval between metal particles (A)" refers to the distance between the outmost surfaces of adjacent metal particles (the distance between the outmost surfaces of the metal particles excluding the thicknesses of coating in cases where the coating is provided). The intervals between the metal particles (A) can be determined from SEM images, TEM images, or AFM images, for example.

In addition, in the metal particle annular structure (C) of the present embodiment, from the viewpoint of achieving a strong manifestation of the functionality as a metamaterial, the metal particles (A) are arranged preferably in a shape of an annulus having a diameter of 15 to 1000 nm, and more preferably in a shape of an annulus having a diameter of 30 to 500 nm.

It is to be noted that the "diameter of the annulus of the metal particles (A) arranged" refers to the diameter of the circle having the largest diameter among the circles defined by connecting the outmost surfaces of the metal particles (A). In cases where the metal particles (A) are not arranged in a perfect circle, the "diameter" is defined as the largest diameter among the diameters of annuluses defined by arbitrary three metal particles (A).

In the metal particle annular structure (C) of the present embodiment, the metal particles (A) and the insulative support (B) having a particle connecting structure preferably have an interaction with each other from the viewpoint of stability of the structure.

Examples of the interaction include an ion-ion interaction (ion bond), a hydrogen bond, a covalent bond, a dipole interaction, London dispersion force (van der Waals force), a charge-transfer interaction (the action of electrons migrating between two molecules to form a complex by Coulomb force), a π-π interaction (trans-annular interaction, dispersive force acting between aromatic rings), and a hydrophobic interaction.

Preferably, at least one pair of the metal particles (A) and the insulative support (B) having a particle connecting structure included in the metal particle annular structure (C) of the present embodiment have such an interaction. More preferably, all of the metal particles (A) and the insulative support (B) having the particle connecting structure have such interactions.

(Method of Forming Metal Particle Annular Structure (C))

Metal particle annular structures (C) in the present disclosure can be prepared by mixing metal particles (A) with insulative supports (B) each having a particle connecting structure.

The insulative supports (B) in the present disclosure each having a particle connecting structure are preferably produced in a micromixer for mixing two or more fluids. Hereinafter, an example will be described in which each insulative support (B) having a particle connecting structure is composed of two anionic particles and one cationic particle interposed between the two anionic particles.

An ingredient of anionic particles, e.g., an anionic latex, is fed to one inlet of a micromixer for mixing two or more fluids, and an ingredient of cationic particles, e.g., a cationic latex, is fed to another inlet in a ratio of the number of anionic particles to the number of cationic particles of 2:1. In this process, control on the residence time of the ingredients in the micromixer after mixing is essential for formation of desired particle connecting structures, and maintaining the residence time to be shorter enables formation of particle connecting structures each composed of three particles in a stable manner.

Alternatively, particle connecting structures each composed of three anionic particles and two cationic particles, for example, can be produced in the above-mentioned method employing a micromixer by feeding ingredients in a ratio of the number of anionic particles to the number of cationic particles of 3:2.

In the present disclosure, in cases where each insulative support (B) having a particle connecting structure is composed of two anionic particles and one cationic particle interposed between the two anionic particles as in the above-mentioned example, metal particle annular structures (C) of the present disclosure can be produced as follows.

Specifically, ingredients are fed to a micromixer under the condition that particle connecting structures are to be generated in a ratio of the number of anionic particles to the number of cationic particles of 2:1. To the resultant particle connecting structures discharged from the micromixer, a certain amount of a colloidal solution of metal particles charged to be anionized, is mixed. In this process, conditions, such as the concentration of the colloidal solution of the metal particles and the property of the liquid, e.g., pH, are controlled, so that a desired number of metal particles (A) are arranged on the surfaces of the cationic particles in each of annular metal particle structures (C).

Multiple particles are made to connect by means of an interaction such as van der Waals force, a covalent bond, or a hydrogen bond, as well as the above-mentioned combination of Coulomb interactions among anionic particles and cationic particles, to thereby form an insulative support (B) in the present disclosure having a particle connecting structure.

The surface condition (such as the zeta-potential, functional groups, and the solubility parameter value) of the metal particles (A) is preferably adjusted in accordance with interaction to be utilized to form particle connecting structures such that the metal particles (A) are firmly immobilized on the insulative supports (B) each having a particle connecting structure when mixed with the insulative supports (B).

Further, metal particle annular structures (C) prepared by mixing insulative supports (B) each having a particle connecting structure and metal particles (A) are preferably subjected to a treatment, such as heat treatment, irradiation with light, and microwave treatment, so that the metal particles (A) are immobilized firmly on the insulative supports (B).

Further, particularly preferably, the resultant metal particle annular structures (C) are coated with an insulating material (second insulating material) as insulator-coated metal particle annular structures (F), so that the metal particles (A) are kept to be immobilized on the insulative supports (B).

Examples of a preferred second insulating material for preparing the insulator-coated metal particle annular structures (F) of the present disclosure include the first insulating material used to produce core-shell metal particles (A-s) of the present disclosure as described above.

The insulator-coated metal particle annular structures (F) of the present disclosure can be prepared by a method similar to the above-mentioned method of producing core-shell metal particles (A-s) of the present disclosure, except that the metal particle annular structures (C) are used in place of the metal particles (A).

(Composition)

A composition of the present embodiment may be a composition including the above-mentioned metal particle annular structures (C) and water and/or an organic solvent, for example.

Examples of the organic solvent include alcohols such as methanol, ethanol, propanol, isopropanol, and butanol; ethers such as dimethyl ether and diisopropyl ether; alkanes such as pentane and hexane; cycloalkanes such as cyclohexane; ethyl methyl ketone; ethylene glycol; chloroform; dichloromethane; tetrahydrofuran; acetone; acetic acid; ethyl acetate; 1,4-dioxane; benzene; toluene; acetonitrile; dimethyl formaldehyde; and dimethyl sulfoxide.

The composition containing the metal particle annular structures (C) and water and/or the organic solvent may be used as a coating agent as such, or may be used for preparing a composition (E) described later, which contains the metal particle annular structures (C) and a resin (D).

In the composition including the metal particle annular structures (C) and water and/or the organic solvent in the present disclosure, the content of the metal particle annular structures (C) is preferably 0.00001 to 99.9% by weight, more preferably 0.001 to 50% by weight, relative to the weight of the composition. A content of the metal particle annular structures (C) of less than 0.00001% by weight is undesirable because the functionality as a metamaterial is less likely to be manifested when the composition is used as a coating agent.

The metal particle annular structures (C) of the present disclosure can also be used in a composition (E) containing the metal particle annular structures (C) and a resin (D).

Any of synthetic resins and natural resins can be used as the resin in the composition (E) of the present disclosure. There are no particular limitations on the form of the resin, and resin pellets or a resin dissolved or dispersed in a solvent may be used. A form of a resin paint is the most preferable for coating applications.

There are no particular limitations on the resin paint that can be used in the present disclosure, and any of well-known paints can be used.

Examples of the resin paint include oily paints, lacquers, solvent-based synthetic resin paints (such as those based on acrylic resins, epoxy resins, urethane resins, fluorine resins, silicone-acrylic resins, alkyd resins, aminoalkyd resins, vinyl resins, unsaturated polyester resins, or rubber chlorides), water-based synthetic resin paints (such as those based on emulsions or aqueous resins), solvent-free synthetic resin paints (such as powder paints), inorganic paints, and electrical insulating paints.

The composition (E) in the present disclosure preferably has a solid content weight ratio (C)/(D) of the metal particle annular structures (C) to the resin (D) of 0.00001-100. The solid content weight ratio (C)/(D) is more preferably 0.0001-10. A solid content weight ratio (C)/(D) of the metal particle annular structures (C) of smaller than 0.00001 is undesirable because the functionality as a metamaterial becomes less likely to be manifested. In contrast, a solid content weight ratio (C)/(D) of the metal particle annular structures (C) of greater than 100 is also undesirable because the transparency of the resultant composition (E) is reduced.

Depending on its application or usage, the metal particle annular structures (C) or the composition (E) of the present disclosure may contain an additive(s) that are typically added to paints or mold resins. Examples of such additive(s) include a thickener, a leveling agent, a thixotropic agent, a defoamer, a frozen stabilizer, a matting agent, a cross-linking catalyst, a pigment, a curing catalyst, a cross-linker, a filler, a antiskinning agent, a dispersant, a mostening agent, an antioxidant, a rheology control agent, a defoamer, a film forming aid, a rust inhibitor, a dye, a plasticizer, a lubricant, a reductant, a preservative, a fungicide, a deodorant, a yellowing inhibitor, an antistatic agent, and a charge regulator. Such additive(s) may be selected and/or combined depending on the intended purpose(s).

The metal particle annular structures (C) or the composition (E) of the present disclosure can be used in a wide variety of applications, including paints, finishes for building materials, adhesives, adhesive agents, paper-processing agents, and finishes for woven fabrics and non-woven fabrics, as well as sealants, adhesives, inks, coating materials, casting materials, elastomers, raw materials of foams and plastics, and fiber treatment agents.

In addition, the composition (E) of the present disclosure can be used to form organic-inorganic composite materials in the form of a coating, a sheet, a fiber, or a formed body.

EXAMPLES

Although the present disclosure will be described with reference to examples, the present disclosure is not limited to the following examples.

In the examples, the following methods and apparatuses were used for measurements:

(1) Optical Measurements

The thickness, the minimum reflectance, the average reflectance, and the refractive index of each of coated films were determined or calculated by a reflection spectroscopic film thickness measurement system FE-3000 (manufactured by OTSUKA ELECTRONICS Co., LTD.).

(2) Measurement of Particle Size

The particle sizes were measured using a dynamic light scattering measurement apparatus ELSZ-1000 (manufactured by OTSUKA ELECTRONICS Co., LTD.).

(3) Micromixer

Slit-Plate Mixer LH 2 micromixer (manufactured by Ehrfeld Mikrotechnik GmbH) was used. The configurations of the mixing plates in the micromixer are as follows.

Mixing plate: LH 2-50/50 µm, 10+10 slits

Aperture plate: LH 2-50 µm, 2 mm

Reference Example 1

To a reactor equipped with a reflux condenser, a drop tank, a thermometer, and a stirring device, 1600 g of deionized water and 3 g of 10% sodium dodecylbenzene sulfonate were charged, and the temperature was then raised to 80° C. under stirring. To this solution, 150 g of a liquid mixture of butyl acrylate, and a liquid mixture of 165 g of methyl methacrylate, 3 g of acrylic acid, 13 g of a reactive emulsifier (trade name: ADEKA REASOAP SR-1025 manufactured by Asahi Denka Co., Ltd., water solution containing 25% by weight of the solid content), 40 g of a water solution of ammonium persulfate of 2% by weight, and 1900 g of deionized water were simultaneously added dropwise over about 2 hours while the temperature in the reaction vessel was maintained at 80° C. The stirring was then continued further for about 2 hours for thermal curing while the temperature in the reaction vessel was maintained at 80° C. The mixture was then cooled to room temperature and filtered through a 100-mesh wire mesh to obtain a water dispersion of emulsified polymer particles having a solid content of 8.3% by weight and a number average particle diameter of 62 nm. The concentration of the emulsion was adjusted to $2\times10^{12}$ particles/mL with distilled water to obtain a water dispersion of emulsified anionic polymer particles (a-1).

Reference Example 2

The concentration of water dispersed colloidal silica as anionic particles having an average particle diameter of 50 nm (trade name: SNOWTEX ST-OL manufactured by Nissan Chemical Industries, Ltd., having a solid content of 20% by weight) was adjusted to $2\times10^{12}$ particles/mL with distilled water to obtain a dispersion of anionic silica (a-2).

Reference Example 3

The concentration of water dispersed colloidal silica as cationic particles having an average particle diameter of 50 nm (trade name: SNOWTEX ST-AK-L manufactured by Nissan Chemical Industries, Ltd., having a solid content of 20% by weight) was adjusted to $1\times10^{12}$ particles/mL with distilled water to obtain a dispersion of cationic silica (b-1).

Reference Example 4

A water dispersed colloidal silica as cationic particles having an average particle diameter of 50 nm (trade name: SNOWTEX ST-OL manufactured by Nissan Chemical Industries, Ltd., having a solid content of 20% by weight) was diluted to a concentration of 5%. A diallyldimethyl ammonium chloride polymer (trade name: PAS-H-10L manufactured by Nitobo Medical Co. Ltd.) having a mean molecular weight (M.W.) of 200,000 was added in an amount equivalent to 1% by weight in terms of the solid content of the water dispersed colloidal silica, and the mixture was exposed to ultrasonic waves to promote dispersion. The concentration of the dispersion was adjusted to $1\times10^{12}$ particles/mL with distilled water to obtain a dispersion of cationic silica (b-2) having an average particle diameter of 51 nm.

Reference Example 5

To a reactor equipped with a reflux condenser, a drop tank, a thermometer, and a stirring device, 250 g of deionized water and 1.5 g of a 20% water solution of Emulgen 1135S-70 (trade name, non-ionic surfactant manufactured by Kao Corporation) were charged, and the temperature was raised to 80° C. under stirring. Thereafter, 4 g of a 2% water solution of 2,2'-azobis (2-methylpropionamidine) dihydrochloride was added to the reactor, and the mixture was stirred at 80° C. for 5 minutes. Thereafter, a liquid mixture of 3.5 g of butyl acrylate, 7 g of methyl methacrylate, 0.5 g of diethylaminoethyl methacrylate, and 2.0 g of quaternary product of dimethylamino propylacrylamide was added dropwise over about 2 hours while the temperature in the reaction vessel was maintained at 80° C. Then, 5.0 g of a 2% water solution of 2,2'-azobis (2-methylpropionamidine) dihydrochloride was further added to the reactor, and the stirring was continued for about 2 hours while the temperature in the reaction vessel was maintained at 80° C. The mixture was then cooled to room temperature and filtered through a 100-mesh wire mesh to obtain a water dispersion of emulsified polymer particles having a solid content of 4.1% by weight and a number average particle diameter of 50 nm. The concentration of the emulsion was adjusted to $2\times10^{12}$ particles/mL with distilled water to obtain a water dispersion of emulsified cationic polymer particles (b-3).

Reference Example 6

To a reactor equipped with a reflux condenser, a drop tank, a thermometer, and a stirring device, 1479.0 g of deionized water and tetrachloroauric acid tetrahydrate (18.0 g) diluted to 1% with distilled water were charged, and the temperature was raised to 90° C. under stirring. To the mixture, 3.2 g of trisodium citrate dihydrate diluted to 5% with distilled water was rapidly added. The stirring was then continued for about 2 hours while the temperature in the reaction vessel was maintained at 90° C. The mixture was then cooled to room temperature to obtain a water dispersion of gold particles with a number average particle diameter of 40 nm.

The resultant water dispersion of the gold particles was purified by repeating a 50% filtration and purification with distilled water four times using a hollow fiber microza UF and ACP-0013D (Asahi Kasei Corporation) at a circulation flow rate of 840 mL/min. under a pressure of 0.04 MPa to obtain a water dispersion of gold particles (A-1) having an average particle diameter of 40 nm.

Reference Example 7

To a reactor equipped with a reflux condenser, a drop tank, a thermometer, and a stirring device, 1000.0 g of the above-mentioned water dispersion of gold particles (A-1) was charged, and the temperature was then raised to 80° C. under stirring. To this mixture, 0.7 g of aminopropyl trimethoxysilane diluted to 0.1% by weight with ethanol was charged. After a reaction was carried out for 5 minutes, 2.5 g of tetraethoxysilane diluted to 1% with ethanol was added dropwise over 30 minutes. The stirring was continued for about 2 hours while the temperature in the reaction vessel was maintained at 80° C. After cooling to room temperature, the dispersion was left at 23° C. for 3 days.

The resultant water dispersion of the silica-coated gold particles was purified by repeating a 50% filtration and purification with distilled water four times using a hollow fiber microza UF and ACP-0013D (Asahi Kasei Corporation) at a circulation flow rate of 840 mL/min. under a pressure of 0.04 MPa to obtain a water dispersion of silica-coated gold particles (A-1s) having an average particle diameter of 50 nm and a concentration of $8.9\times10^{10}$ particles/mL.

Figure 4:
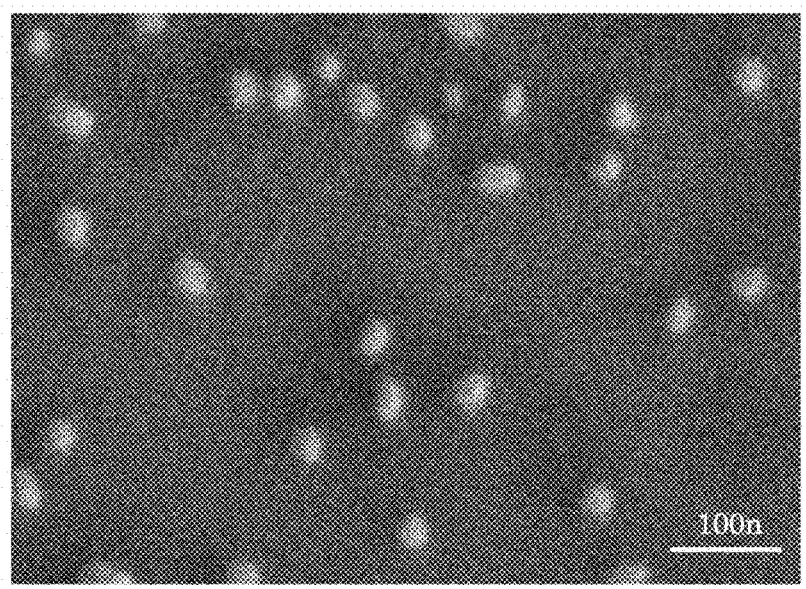
FIG. 4 is an SEM image of silica-coated gold particles (A-2) prepared in Reference Example 4.

The resultant water dispersion of the silica-coated gold particles (A-1s) was dropped onto a silicon wafer, dried under a reduced pressure, and observed under an SEM (FIG. 4).

Reference Example 8

To a reactor equipped with a reflux condenser, a drop tank, a thermometer, and a stirring device, 1479.0 g of deionized water and tetrachloroauric acid tetrahydrate (18.0 g) diluted to 1% with distilled water were charged, and the temperature was raised to 90° C. under stirring. To the mixture, 6.0 g of trisodium citrate dihydrate diluted to 5% with distilled water was rapidly added. The stirring was then continued for about 2 hours while the temperature in the reaction vessel was maintained at 90° C. The mixture was then cooled to room temperature to obtain a water dispersion of gold particles with a number average particle diameter of 21 nm.

The resultant water dispersion of the gold particles was purified by repeating a 50% filtration and purification with distilled water four times using a hollow fiber microza UF and ACP-0013D (Asahi Kasei Corporation) at a circulation flow rate of 840 mL/min. under a pressure of 0.04 MPa to obtain a water dispersion of gold particles (A-2) having an average particle diameter of 21 nm.

Subsequently, 1000.0 g of the above-mentioned water dispersion of gold particles (A-2) was charged into a reactor equipped with a reflux condenser, a drop tank, a thermometer, and a stirring device, and the temperature was then raised to 80° C. under stirring. To this mixture, 1.27 g of aminopropyl trimethoxysilane diluted to 0.1% by weight with ethanol was charged. After a reaction was carried out for 5 minutes, 5.20 g of tetraethoxysilane diluted to 1% with ethanol was added dropwise over 30 minutes. The stirring was continued for about 2 hours while the temperature in the reaction vessel was maintained at 80° C. The mixture was then cooled to room temperature and allowed to stand at 23° C. for 3 days to obtain a water dispersion of silica-coated gold particles.

The resultant water dispersion of the silica-coated gold particles was purified by repeating a 50% filtration and purification with distilled water four times using a hollow fiber microza UF and ACP-0013D (Asahi Kasei Corporation) at a circulation flow rate of 840 mL/min. under a pressure of 0.04 MPa, and the concentration was adjusted to $8.9 \times 10^{10}$ particles/mL by adding distilled water, to obtain a water dispersion of silica-coated gold particles (A-2s) having an average particle diameter of 50 nm.

Reference Example 9

To a reactor equipped with a reflux condenser, a drop tank, a thermometer, and a stirring device, 1479.0 g of deionized water and a water solution of silver nitrate (18.0 g) diluted to 1% with distilled water were charged, and the temperature was raised to 90° C. under stirring. To the mixture, 6.0 g of trisodium citrate dihydrate diluted to 5% with distilled water was rapidly added. The stirring was then continued for about 2 hours while the temperature in the reaction vessel was maintained at 90° C. The mixture was then cooled to room temperature to obtain a water dispersion of silver particles (A-3) with a number average particle diameter of 40 nm.

The resultant water dispersion of the silver particles was purified by repeating a 50% filtration and purification with distilled water four times using a hollow fiber microza UF and ACP-0013D (Asahi Kasei Corporation) at a circulation flow rate of 840 mL/min. under a pressure of 0.04 MPa, and the concentration was adjusted to $8.9 \times 10^{10}$ particles/mL by adding distilled water, to obtain a water dispersion of silver particles (A-3) having an number average particle diameter of 40 nm.

Reference Example 10

To a reactor equipped with a reflux condenser, a drop tank, a thermometer, and a stirring device, 1600 g of deionized water and 3 g of 10% sodium dodecylbenzene sulfonate were charged, and the temperature was then raised to 80° C. under stirring. To this solution, 150 g of a liquid mixture of butyl acrylate, and a liquid mixture of 165 g of methyl methacrylate, 3 g of acrylic acid, 13 g of a reactive emulsifier (trade name: ADEKA REASOAP SR-1025 manufactured by Asahi Denka Co., Ltd., water solution containing 25% by weight of the solid content), 40 g of a water solution of ammonium persulfate of 2% by weight, and 1900 g of deionized water were simultaneously added dropwise over about 2 hours while the temperature in the reaction vessel was maintained at 80° C. The stirring was then continued further for about 2 hours for thermal curing while the temperature in the reaction vessel was maintained at 80° C. The mixture was then cooled to room temperature and filtered through a 100-mesh wire mesh to obtain a water dispersion of emulsified polymer particles having a solid content of 8.3% by weight and a number average particle diameter of 62 nm. The concentration of the emulsion was adjusted to 1% by mass with distilled water to obtain a water dispersion of emulsified anionic polymer particles (a-4).

Reference Example 11

Figure 5:
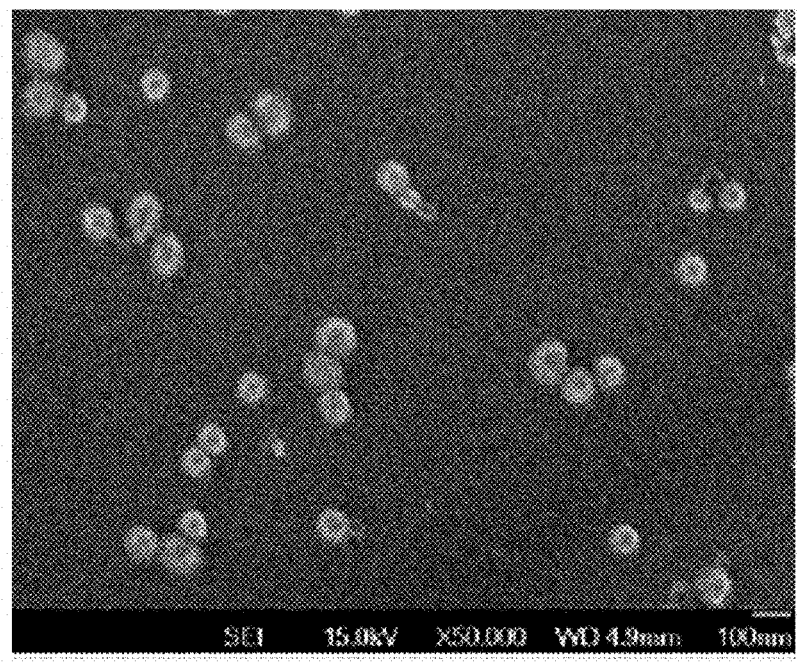
FIG. 5 is an SEM image of insulative supports (B-1) having particle connecting structures prepared in Reference Example 5.

The water dispersion of the anionic particles (a-1) prepared in Reference Example 1 and the water dispersion of the cationic particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was dropped onto a silicon wafer cooled with liquid nitrogen to instantaneously freeze the liquid mixture. The frozen solution was dried under a reduced pressure, and formation of structures each having three particles connected to each other was confirmed under the SEM (FIG. 5).

Example 1

The water dispersion of the anionic particles (a-1) prepared in Reference Example 1 and the water dispersion of the cationic silica particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-1).

Figure 6:
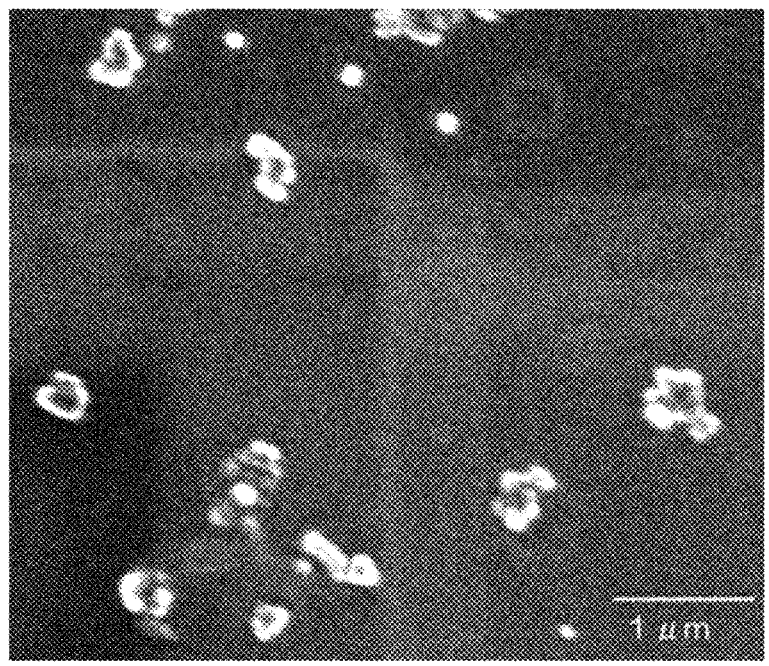
FIG. 6 is an SEM image of gold particle annular structures (C-1) prepared in Example 1.

The resultant reaction solution (C-1) was dropped onto a silicon wafer, and dried under a reduced pressure. Formation of gold particle annular structures each having gold particles arranged in a shape of an annulus was confirmed under the SEM (FIG. 6).

To a white glass substrate having an area of 5 cm² and a thickness of 2 mm, 2.0 g of the reaction solution (C-1) prepared in the above procedure was applied, and dried at room temperature for 24 hours, to obtain a glass substrate having gold particle annular structures carried thereon. A 2.5% water solution of PVA235 (polyvinyl alcohol, manufactured by Kuraray Co., Ltd.) was applied onto the resultant glass substrate having the gold particle annular structures carried thereon by a spin coater under the condition of 1200 rpm for 5 seconds to obtain a glass substrate having gold particle annular structures embedded in PVA (E-1) carried thereon. Optical measurements of this glass substrate having gold particle annular structures embedded in PVA (E-1) carried thereon gave an average reflectance of 3.5% at wavelengths of 450 to 650 nm and a minimal reflectance of 1.5% at wavelengths of 350 to 800 nm. The gold particle annular structures embedded in PVA (E-1) had a film thickness of 110 nm and a refractive index n of 1.05 at 550 nm, which were calculated from the obtained reflectance data using the least-squares method.

Example 2

The water dispersion of the anionic particles (a-1) prepared in Reference Example 1 and the water dispersion of the cationic particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the gold particles (A-1) prepared in Reference Example 6 which was stirred by a magnetic stirrer to obtain a reaction solution (C-2).

Further, 3.5 g of a 1.0% water solution of PVA235 (polyvinyl alcohol, manufactured by Kuraray Co., Ltd.) was added to the resultant reaction solution (C-2) which was stirred by a magnetic stirrer to obtain a PVA water solution (E-2) containing the gold particle annular structures. The reaction solution (E-2) prepared in the above procedure was applied onto a PET film pre-treated with corona and having an area of 5 cm² and a thickness of 200 μm using a wire bar coater. The coating was dried at room temperature for 24 hours to obtain a PET substrate having a dry coating film of (E-2). Optical measurements of this PET substrate having a dry coating film of (E-2) gave an average reflectance of 2.95% at wavelengths of 450 to 650 nm and a minimal reflectance of 2.43% at wavelengths of 350 to 800 nm. The dry coating film of (E-2) had a film thickness of 152 nm and a refractive index n of 1.24 at 550 nm, which were calculated from the obtained reflectance data using the least-squares method.

Example 3

The water dispersion of the anionic particles (a-1) prepared in Reference Example 1 and the water dispersion of the cationic particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-3).

Further, 3.5 g of a 1.0% water solution of PVA235 (polyvinyl alcohol, manufactured by Kuraray Co., Ltd.) was added to the resultant reaction solution (C-3) which was stirred by a magnetic stirrer to obtain a PVA water solution (E-3) containing the gold particle annular structures. The reaction solution (E-3) prepared in the above procedure was applied onto a PET film pre-treated with corona and having an area of 5 cm² and a thickness of 200 μm using a wire bar coater. The coating was dried at room temperature for 24 hours to obtain a PET substrate having a dry coating film of (E-3). Optical measurements of this PET substrate having a dry coating film of (E-3) gave an average reflectance of 2.70% at wavelengths of 450 to 650 nm and a minimal reflectance of 2.13% at wavelengths of 350 to 800 nm. The dry coating film of (E-3) had a film thickness of 148 nm and a refractive index n of 1.14 at 550 nm, which were calculated from the obtained reflectance data using the least-squares method.

Example 4

The water dispersion of the anionic particles (a-1) prepared in Reference Example 1 and the water dispersion of the cationic particles (b-1) prepared in Reference Example 4 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-4).

Further, 3.5 g of a 1.0% water solution of PVA235 (polyvinyl alcohol, manufactured by Kuraray Co., Ltd.) was added to the resultant reaction solution (C-4) which was stirred by a magnetic stirrer to obtain a PVA water solution (E-4) containing the gold particle annular structures. The reaction solution (E-4) prepared in the above procedure was applied onto a PET film pre-treated with corona and having an area of 5 cm² and a thickness of 200 μm using a wire bar coater. The coating was dried at room temperature for 24 hours to obtain a PET substrate having a dry coating film of (E-4). Optical measurements of this PET substrate having a dry coating film of (E-4) gave an average reflectance of 2.52% at wavelengths of 450 to 650 nm and a minimal reflectance of 2.11% at wavelengths of 350 to 800 nm. The dry coating film of (E-4) had a film thickness of 152 nm and a refractive index n of 1.12 at 550 nm, which were calculated from the obtained reflectance data using the least-squares method.

Example 5

The water dispersion of the anionic particles (a-1) prepared in Reference Example 1 and the water dispersion of the cationic particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated silver particles (A-3) prepared in Reference Example 9 which was stirred by a magnetic stirrer to obtain a reaction solution (C-5).

Further, 3.5 g of a 1.0% water solution of PVA235 (polyvinyl alcohol, manufactured by Kuraray Co., Ltd.) was added to the resultant reaction solution (C-5) which was stirred by a magnetic stirrer to obtain a PVA water solution (E-5) containing the gold particle annular structures. The reaction solution (E-5) prepared in the above procedure was applied onto a PET film pre-treated with corona and having an area of 5 cm² and a thickness of 200 μm using a wire bar coater. The coating was dried at room temperature for 24 hours to obtain a PET substrate having a dry coating film of (E-5). Optical measurements of this PET substrate having a dry coating film of (E-5) gave an average reflectance of 11.35% at wavelengths of 450 to 650 nm and a minimal reflectance of 2.57% at wavelengths of 350 to 800 nm. The dry coating film of (E-5) had a film thickness of 150 nm and a refractive index n of 1.79 at 550 nm, which were calculated from the obtained reflectance data using the least-squares method.

Example 6

The water dispersion of the anionic particles (a-1) prepared in Reference Example 1 and the water dispersion of the cationic particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-2s) prepared in Reference Example 8 which was stirred by a magnetic stirrer to obtain a reaction solution (C-6).

Further, 0.6 g of a 1.0% water solution of PVA235 (polyvinyl alcohol, manufactured by Kuraray Co., Ltd.) was added to the resultant reaction solution (C-6) which was stirred by a magnetic stirrer to obtain a PVA water solution (E-6) containing the gold particle annular structures. The reaction solution (E-6) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-6). Optical measurements of this PET substrate having a dry coating film of (E-6) gave an average reflectance of 2.88% at wavelengths of 450 to 650 nm and a minimal reflectance of 2.38% at wavelengths of 350 to 800 nm. The dry coating film of (E-6) had a film thickness of 149 nm and a refractive index n of 1.19 at 550 nm, which were calculated from the obtained reflectance data using the least-squares method.

Example 7

The water dispersion of the anionic particles (a-2) prepared in Reference Example 2 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-7).

Further, 3.5 g of a 1.0% water solution of PVA235 (polyvinyl alcohol, manufactured by Kuraray Co., Ltd.) was added to the resultant reaction solution (C-7) which was stirred by a magnetic stirrer to obtain a PVA water solution (E-7) containing the gold particle annular structures. The reaction solution (E-7) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-7). Optical measurements of this PET substrate having a dry coating film of (E-7) gave an average reflectance of 2.75% at wavelengths of 450 to 650 nm and a minimal reflectance of 2.33% at wavelengths of 350 to 800 nm. The dry coating film of (E-7) had a film thickness of 150 nm and a refractive index n of 1.17 at 550 nm, which were calculated from the obtained reflectance data using the least-squares method.

Example 8

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-8).

Further, 3.5 g of a 1.0% water solution of PVA235 (polyvinyl alcohol, manufactured by Kuraray Co., Ltd.) was added to the resultant reaction solution (C-8) which was stirred by a magnetic stirrer to obtain a PVA water solution (E-8) containing the gold particle annular structures. The reaction solution (E-8) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-8). Optical measurements of this PET substrate having a dry coating film of (E-8) gave an average reflectance of 2.45% at wavelengths of 450 to 650 nm and a minimal reflectance of 2.02% at wavelengths of 350 to 800 nm. The dry coating film of (E-8) had a film thickness of 152 nm and a refractive index n of 1.09 at 550 nm, which were calculated from the obtained reflectance data using the least-squares method.

Example 9

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-9).

Subsequently, 100 mL of the reaction solution (C-9) was charged into a reactor equipped with a reflux condenser, a drop tank, a thermometer, and a stirring device, and stirring was continued for about 6 hours while the temperature in the reaction vessel was maintained at 80° C. The mixture was then cooled to room temperature to obtain a reaction solution (C-9 heated).

Further, 3.5 g of a 1.0% water solution of PVA235 (polyvinyl alcohol, manufactured by Kuraray Co., Ltd.) was added to the resultant reaction solution (C-9 heated) which was stirred by a magnetic stirrer to obtain a PVA water solution (E-9) containing the gold particle annular structures. The reaction solution (E-9) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-9). Optical measurements of this PET substrate having a dry coating film of (E-9) gave an average reflectance of 2.31% at wavelengths of 450 to 650 nm and a minimal reflectance of 1.82% at wavelengths of 350 to 800 nm. The dry coating film of (E-9) had a film thickness of 152 nm and a refractive index n of 1.08 at 550 nm, which were calculated from the obtained reflectance data using the least-squares method.

Example 10

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-10).

Subsequently, 100 mL of the reaction solution (C-10) was charged into a reactor equipped with a reflux condenser, a drop tank, a thermometer, and a stirring device, and the temperature in the reaction vessel was raised to 80° C. To this mixture, 0.5 g of aminopropyl trimethoxysilane diluted to 0.1% by weight with ethanol was added. After a reaction was carried out for 5 minutes, 2.0 g of tetraethoxysilane diluted to 1% with ethanol was added dropwise over 30 minutes. The stirring was further continued for about 6 hours while the temperature in the reaction vessel was maintained at 80° C. The reaction solution was then cooled to room temperature to obtain a reaction solution (F-10) containing insulator-coated metal particle annular structures.

Further, 3.5 g of a 1.0% water solution of PVA235 (polyvinyl alcohol, manufactured by Kuraray Co., Ltd.) was added to the resultant reaction solution (F-10) which was stirred by a magnetic stirrer to obtain a PVA water solution (E-10) containing the gold particle annular structures. The reaction solution (E-10) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-10). Optical measurements of this PET substrate having a dry coating film of (E-10) gave an average reflectance of 2.25% at wavelengths of 450 to 650 nm and a minimal reflectance of 1.73% at wavelengths of 350 to 800 nm. The dry coating film of (E-10) had a film thickness of 156 nm and a refractive index n of 1.06 at 550 nm, which were calculated from the obtained reflectance data using the least-squares method.

Example 11

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-11).

Subsequently, 100 mL of the reaction solution (C-11) was charged into a reactor equipped with a reflux condenser, a drop tank, a thermometer, and a stirring device, and the temperature in the reaction vessel was raised to 80° C. To this mixture, 0.5 g of aminopropyl trimethoxysilane diluted to 0.1% by weight with ethanol was added. After a reaction was carried out for 5 minutes, 2.0 g of tetraethoxysilane diluted to 1% with ethanol was added dropwise over 30 minutes. The stirring was further continued for about 6 hours while the temperature in the reaction vessel was maintained at 80° C. The mixture was then cooled to room temperature to obtain a reaction solution (F-11).

Further, 7.1 g of a 1.0% water solution of PVA235 (polyvinyl alcohol, manufactured by Kuraray Co., Ltd.) was added to the resultant reaction solution (F-11) which was stirred by a magnetic stirrer to obtain a PVA water solution (E-11) containing the gold particle annular structures. The reaction solution (E-11) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-11). Optical measurements of this PET substrate having a dry coating film of (E-11) gave an average reflectance of 2.50% at wavelengths of 450 to 650 nm and a minimal reflectance of 1.88% at wavelengths of 350 to 800 nm. The dry coating film of (E-11) had a film thickness of 155 nm and a refractive index n of 1.10 at 550 nm, which were calculated from the obtained reflectance data using the least-squares method.

Example 12

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-12).

Subsequently, 100 mL of the reaction solution (C-12) was charged into a reactor equipped with a reflux condenser, a drop tank, a thermometer, and a stirring device, and the temperature in the reaction vessel was raised to 80° C. To this mixture, 0.5 g of aminopropyl trimethoxysilane diluted to 0.1% by weight with ethanol was added. After a reaction was carried out for 5 minutes, 2.0 g of tetraethoxysilane diluted to 1% with ethanol was added dropwise over 30 minutes. The stirring was further continued for about 6 hours while the temperature in the reaction vessel was maintained at 80° C. The mixture was then cooled to room temperature to obtain a reaction solution (F-12).

Further, 3.5 g of a 1.0% water solution of PVA235 (polyvinyl alcohol, manufactured by Kuraray Co., Ltd.) was added to the resultant reaction solution (F-12) which was stirred by a magnetic stirrer to obtain a PVA water solution (E-12) containing the gold particle annular structures. The reaction solution (E-12) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-12). Optical measurements of this PET substrate having a dry coating film of (E-12) gave an average reflectance of 2.20% at wavelengths of 450 to 650 nm and a minimal reflectance of 1.50% at wavelengths of 350 to 800 nm. The dry coating film of (E-12) had a film thickness of 152 nm and a refractive index n of 1.04 at 550 nm, which were calculated from the obtained reflectance data using the least-squares method.

Example 13

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-12).

Subsequently, 100 mL of the reaction solution (C-12) was charged into a reactor equipped with a reflux condenser, a drop tank, a thermometer, and a stirring device, and the temperature in the reaction vessel was raised to 80° C. To this mixture, 0.5 g of aminopropyl trimethoxysilane diluted to 0.1% by weight with ethanol was added. After a reaction was carried out for 5 minutes, 2.0 g of tetraethoxysilane diluted to 1% with ethanol was added dropwise over 30 minutes. The stirring was further continued for about 6 hours while the temperature in the reaction vessel was maintained at 80° C. The mixture was then cooled to room temperature to obtain a reaction solution (F-13).

Further, 3.5 g of the 1.0% by weight of the water dispersion of the emulsified anionic polymer particles (a-4) synthesized in Reference Example 10 was added to the resultant reaction solution (F-13) while the reaction solution was being stirred with a magnetic stirrer to obtain a liquid mixture (E-13) of the anionic latex and the gold particle annular structures.

The reaction solution (E-13) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-13). Optical measurements of this PET substrate having a dry coating film of (E-13) gave an average reflectance of 2.51% at wavelengths of 450 to 650 nm and a minimal reflectance of 1.90% at wavelengths of 350 to 800 nm. The dry coating film of (E-13) had a film thickness of 156 nm and a refractive index n of 1.12 at 550 nm, which were calculated from the obtained reflectance data using the least-squares method.

Example 14

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of the water dispersion of the silica-coated gold particles (A-1s) prepared in Reference Example 7 which was stirred by a magnetic stirrer to obtain a reaction solution (C-14).

Further, 3.5 g of the 1.0% by weight of the water dispersion of the emulsified anionic polymer particles (a-4) synthesized in Reference Example 10 was added to the resultant reaction solution (F-14) while the reaction solution was being stirred with a magnetic stirrer to obtain a liquid mixture (E-14) of the anionic latex and the gold particle annular structures.

The reaction solution (E-14) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E-14). Optical measurements of this PET substrate having a dry coating film of (E-14) gave an average reflectance of 2.68% at wavelengths of 450 to 650 nm and a minimal reflectance of 2.10% at wavelengths of 350 to 800 nm. The dry coating film of (E-14) had a film thickness of 152 nm and a refractive index n of 1.15 at 550 nm, which were calculated from the obtained reflectance data using the least-squares method.

Comparative Example 1

To a white glass substrate having an area of 5 cm$^2$ and a thickness of 2 mm, 2.0 g of the silica-coated gold particles (A-1s) prepared in Reference Example 7 was applied, and dried at room temperature for 24 hours, to obtain a glass substrate having gold particle annular structures carried thereon. A 2.5% aqueous solution of PVA235 (polyvinyl alcohol, manufactured by Kuraray Co., Ltd.) was applied onto the resultant glass substrate having the gold particle annular structures carried thereon by a spin coater under the condition of 1200 rpm for 5 seconds to obtain a glass substrate having gold particle annular structures embedded in PVA (E'-1) carried thereon. Optical measurements of this glass substrate having gold particle annular structures embedded in PVA (E'-1) carried thereon gave an average reflectance of 4.32% at wavelengths of 450 to 650 nm and a minimal reflectance of 3.41% at wavelengths of 350 to 800 nm. The dry coating film of (E'-1) had a film thickness of 105 nm and a refractive index n of 1.51 at 550 nm, which were calculated from the obtained reflectance data using the least-squares method.

Comparative Example 2

To 100 mL of the water dispersion of the silica-coated gold particles (A-1s) prepared in Reference Example 7, 3.5 g of a 1.0% water solution of PVA235 (polyvinyl alcohol, manufactured by Kuraray Co., Ltd.) was added while the water dispersion was being stirred by a magnetic stirrer to obtain a PVA water solution (E'-2) containing the gold particle annular structures. The reaction solution (E'-2) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E'-2). Optical measurements of this PET substrate having a dry coating film of (E'-2) gave an average reflectance of 4.29% at wavelengths of 450 to 650 nm and a minimal reflectance of 3.23% at wavelengths of 350 to 800 nm. The dry coating film of (E'-2) had a film thickness of 150 nm and a refractive index n of 1.50 at 550 nm, which were calculated from the obtained reflectance data using the least-squares method.

Comparative Example 3

To 100 mL of the water dispersion of the silica-coated gold particles (A-2s) prepared in Reference Example 8, 0.56 g of a 1.0% water solution of PVA235 (polyvinyl alcohol, manufactured by Kuraray Co., Ltd.) was added while the water dispersion was being stirred by a magnetic stirrer to obtain a PVA water solution (E'-3) containing the gold particle annular structures. The reaction solution (E'-3) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E'-3). Optical measurements of this PET substrate having a dry coating film of (E'-3) gave an average reflectance of 4.28% at wavelengths of 450 to 650 nm and a minimal reflectance of 3.14% at wavelengths of 350 to 800 nm. The dry coating film of (E'-3) had a film thickness of 144 nm and a refractive index n of 1.51 at 550 nm, which were calculated from the obtained reflectance data using the least-squares method.

Comparative Example 4

To 100 mL of the water dispersion of the silica-coated silver particles (A-3s) prepared in Reference Example 9, 3.5 g of a 1.0% water solution of PVA235 (polyvinyl alcohol, manufactured by Kuraray Co., Ltd.) was added while the water dispersion was being stirred by a magnetic stirrer to obtain a PVA water solution (E'-4) containing the gold particle annular structures. The reaction solution (E'-4) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E'-4). Optical measurements of this PET substrate having a dry coating film of (E'-4) gave an average reflectance of 4.45% at wavelengths of 450 to 650 nm and a minimal reflectance of 3.38% at wavelengths of 350 to 800 nm. The dry coating film of (E'-4) had a film thickness of 151 nm and a refractive index n of 1.56 at 550 nm, which were calculated from the obtained reflectance data using the least-squares method.

Comparative Example 5

To 100 mL of distilled water, 3.5 g of a 1.0% water solution of PVA235 (polyvinyl alcohol, manufactured by Kuraray Co., Ltd.) was added while the distilled water was being stirred by a magnetic stirrer to obtain a PVA water solution. The resultant PVA water solution was applied onto a PET film pre-treated with corona and having an area of 5 cm$^2$ and a thickness of 200 μm using a wire bar coater. The coating was dried at room temperature for 24 hours to obtain a PET substrate having a dry coating film of PVA. Optical measurements of this PET substrate having the PVA film gave an average reflectance of 4.21% at wavelengths of 450 to 650 nm and a minimal reflectance of 3.62% at wavelengths of 350 to 800 nm. The dry coating film of PVA had a film thickness of 148 nm and a refractive index n of 1.15 at 550 nm, which were calculated from the obtained reflectance data using the least-squares method.

Comparative Example 6

A 2.5% water solution of PVA235 (Kuraray Co., Ltd., polyvinyl alcohol) was applied onto a white plate glass substrate with an area of 5 cm$^2$ and a thickness of 2 mm with a spin coater under the conditions of 1200 rpm and 5 seconds to obtain a PVA-coated glass substrate. Optical measurements of this PVA-coated glass substrate gave an average reflectance of 4.20% at wavelengths of 450 to 650 nm and a minimal reflectance of 3.62% at wavelengths of 350 to 800 nm. The dry coating film of PVA had a film thickness of 107 nm and a refractive index n of 1.15 at 550 nm, which were calculated from the obtained reflectance data using the least-squares method.

Comparative Example 7

The water dispersion of the anionic particles (a-1) prepared in Reference Example 1 and the water dispersion of the cationic particles (b-1) prepared in Reference Example 3 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise for 10.1 seconds to 100 mL of distilled water prepared in Reference Example 7 which was stirred by a magnetic stirrer to obtain a reaction solution (B-7).

Further, 3.5 g of a 1.0% water solution of PVA235 (polyvinyl alcohol, manufactured by Kuraray Co., Ltd.) was added to the resultant reaction solution (B-7) while the reaction solution was being stirred by a magnetic stirrer, which resulted in coagulation sedimentation.

Comparative Example 8

The water dispersion of the anionic particles (a-1) prepared in Reference Example 1 and the water dispersion of the cationic particles (b-3) prepared in Reference Example 5 were each fed to the micromixer at 5.0 mL/min. by syringe pumps. The liquid mixture discharged from the micromixer through a silicone tube having an inner diameter of 1 mm and a length of 106 mm connected to the outlet of the micromixer was added dropwise to 100 mL of the water dispersion of the silica-coated gold particles (A-1s) prepared in Reference Example 7 for 50.0 seconds while the water dispersion was being stirred by a magnetic stirrer to obtain a reaction solution (C'-8).

Subsequently, 100 mL of the reaction solution (C'-8) was charged into a reactor equipped with a reflux condenser, a drop tank, a thermometer, and a stirring device, and the temperature in the reaction vessel was raised to 80° C. To this mixture, 0.5 g of aminopropyl trimethoxysilane diluted to 0.1% by weight with ethanol was added. After a reaction was carried out for 5 minutes, 2.0 g of tetraethoxysilane diluted to 1% with ethanol was added dropwise over 30 minutes. The stirring was further continued for about 6 hours while the temperature in the reaction vessel was maintained at 80° C. The mixture was then cooled to room temperature to obtain a reaction solution (F'-8).

Further, 3.5 g of a 1.0% water solution of PVA235 (polyvinyl alcohol, manufactured by Kuraray Co., Ltd.) was added to the resultant reaction solution (F'-8) which was stirred by a magnetic stirrer to obtain a PVA water solution (E'-8) containing the gold particle annular structures. The reaction solution (E'-8) prepared in the above procedure was applied onto a PET film pre-treated with corona and having an area of 5 cm$^2$ and a thickness of 200 μm using a wire bar coater. The coating was dried at room temperature for 24 hours to obtain a PET substrate having a dry coating film of (E'-8). Optical measurements of this PET substrate having a dry coating film of (E'-8) gave an average reflectance of 3.81% at wavelengths of 450 to 650 nm and a minimal reflectance of 3.12% at wavelengths of 350 to 800 nm. The dry coating film of (E'-8) had a film thickness of 153 nm and a refractive index n of 1.47 at 550 nm, which were calculated from the obtained reflectance data using the least-squares method.

The details of Examples 1 to 14 and Comparative Examples 1 to 8 are summarized in Table 1.

TABLE 1

| | Substrate | First insulative particles (a) | Second insulative particles (b) | Metal particles (A) | Metal annular structures | Resin compotion | Thickness (nm) | Minimum reflectance (%) | Average reflectance (%) | Refractive index |
|---|---|---|---|---|---|---|---|---|---|---|
| Example 1 | Glass | Ref. Ex. 1 | Ref. Ex. 3 | Ref. Ex. 7 | C-1 | E-1 | 110 | 1.5 | 3.5 | 1.05 |
| Example 2 | PET | Ref. Ex. 1 | Ref. Ex. 3 | Ref. Ex. 6 | C-2 | E-2 | 152 | 2.43 | 2.95 | 1.24 |
| Example 3 | PET | Ref. Ex. 1 | Ref. Ex. 3 | Ref. Ex. 7 | C-3 | E-3 | 148 | 2.13 | 2.70 | 1.14 |
| Example 4 | PET | Ref. Ex. 1 | Ref. Ex. 4 | Ref. Ex. 7 | C-4 | E-4 | 152 | 2.11 | 2.52 | 1.12 |
| Example 5 | PET | Ref. Ex. 1 | Ref. Ex. 3 | Ref. Ex. 9 | C-5 | E-5 | 150 | 2.57 | 11.35 | 1.79 |
| Example 6 | PET | Ref. Ex. 1 | Ref. Ex. 3 | Ref. Ex. 8 | C-6 | E-6 | 149 | 2.38 | 2.88 | 1.19 |
| Example 7 | PET | Ref. Ex. 2 | Ref. Ex. 5 | Ref. Ex. 7 | C-7 | E-7 | 150 | 2.33 | 2.75 | 1.17 |
| Example 8 | PET | Ref. Ex. 1 | Ref. Ex. 5 | Ref. Ex. 7 | C-8 | E-8 | 152 | 2.02 | 2.45 | 1.09 |
| Example 9 | PET | Ref. Ex. 1 | Ref. Ex. 5 | Ref. Ex. 7 | C-9 heated | E-9 | 152 | 1.82 | 2.31 | 1.08 |
| Example 10 | PET | Ref. Ex. 1 | Ref. Ex. 5 | Ref. Ex. 7 | F-10 | E-10 | 156 | 1.73 | 2.25 | 1.06 |
| Example 11 | PET | Ref. Ex. 1 | Ref. Ex. 5 | Ref. Ex. 7 | F-11 | E-11 | 155 | 1.88 | 2.50 | 1.10 |
| Example 12 | PET | Ref. Ex. 1 | Ref. Ex. 5 | Ref. Ex. 7 | F-12 | E-12 | 152 | 1.50 | 2.20 | 1.04 |
| Example 13 | PET | Ref. Ex. 1 | Ref. Ex. 5 | Ref. Ex. 7 | F-13 | E-13 | 156 | 1.90 | 2.51 | 1.12 |
| Example 14 | PET | Ref. Ex. 1 | Ref. Ex. 5 | Ref. Ex. 7 | C-14 | E-14 | 152 | 2.01 | 2.68 | 1.15 |
| Comp. Ex. 1 | Glass | — | — | Ref. Ex. 7 | — | — | 105 | 3.41 | 4.32 | 1.51 |
| Comp. Ex. 2 | PET | — | — | Ref. Ex. 7 | — | — | 150 | 3.23 | 4.29 | 1.50 |
| Comp. Ex. 3 | PET | — | — | Ref. Ex. 8 | — | — | 144 | 3.14 | 4.28 | 1.51 |
| Comp. Ex. 4 | PET | — | — | Ref. Ex. 9 | — | — | 151 | 3.38 | 4.45 | 1.56 |
| Comp. Ex. 5 | PET | — | — | — | — | — | 148 | 3.62 | 4.21 | 1.51 |
| Comp. Ex. 6 | Glass | — | — | — | — | — | 107 | 3.62 | 4.20 | 1.51 |
| Comp. Ex. 7 | — | Ref. Ex. 1 | Ref. Ex. 3 | — | B-7 | — | — | — | — | — |
| Comp. Ex. 8 | PET | Ref. Ex. 1 | Ref. Ex. 5 | Ref. Ex. 7 | F'-8 | E'-8 | 153 | 3.12 | 3.81 | 1.47 |

* Ref. Ex. = Reference Example, Comp. Ex. = Comparative Example

INDUSTRIAL APPLICABILITY

In accordance with the present disclosure, provided are a metal particle annular structure and an insulator-coated metal particle annular structure as nanometer-scale resonator structures which are novel and are capable of functioning as a metamaterial in three dimensions, and a composition including the same.

REFERENCE SIGNS LIST

1a Anionic particle (first insulative particle)
1b Cationic particle (second insulative particle)
1A Metal particle
2a Anionic particle (first insulative particle)
2b Cationic particle (second insulative particle)
2A Metal particle
b Cationic particle (1b or 2b)
A Metal particle (1A or 2A)

The invention claimed is:

1. A metal particle annular structure (C) comprising:
an insulative support (B) having a particle connecting structure comprising a plurality of particles connecting to one another; and
a plurality of metal particles (A) arranged annularly around the insulative support (B), wherein
the particle connecting structure has a structure in which a first insulative particle (a) and a second insulative particle (b) are alternately connected in a chain, and the plurality of metal particles (A) are arranged around the first insulative particle (a) or the second insulative particle (b).

2. The metal particle annular structure (C) according to claim 1, wherein the first insulative particle (a) is an anionic particle, and the second insulative particle (b) is a cationic particle.

3. The metal particle annular structure (C) according to claim 1, wherein a number of the plurality of metal particles (A) is 3 or more and 30 or less.

4. The metal particle annular structure (C) according to claim 1, wherein the plurality of metal particles (A) have an average diameter of 5 nm or more and 200 nm or less.

5. The metal particle annular structure (C) according to claim 1, wherein the metal particles (A) are arranged so as to form an annulus having an outer diameter of 15 nm to 1000 nm.

6. The metal particle annular structure (C) according to claim 1, wherein the metal particles (A) are of a conductor selected from the group consisting of gold, silver, copper, lead, zinc, tin, iron, and aluminum.

7. The metal particle annular structure (C) according to claim 1, wherein the metal particles (A) are core-shell metal particles (A-s), a surface of each core-shell metal particles (A-s) being coated with a first insulating material.

8. The metal particle annular structure (C) according to claim 7, wherein the plurality of metal particles (A) have an average thickness of the first insulating material of 1 nm or more and 80 nm or less.

9. The metal particle annular structure (C) according to claim 7, wherein the first insulating material is at least one selected from the group consisting of a metal oxide, a metal nitride, a metal sulfide, a phosphate salt, and an organic compound.

10. An insulator-coated metal particle annular structure (F) comprising:
the metal particle annular structure (C) according to claim 1 coated with a second insulating material.

11. A composition comprising:
a plurality of the metal particle annular structures (C) according to claim 1 and/or a plurality of the insulator-coated metal particle annular structures (F) according to claim 10; and
water and/or an organic solvent.

12. A composition (E) comprising:
a plurality of the metal particle annular structures (C) according to claim 1 and/or a plurality of the insulator-coated metal particle annular structures (F) according to claim 10; and
a resin (D).

13. The metal particle annular structure (C) according to claim 1, wherein a number of the plurality of metal particles (A) is 3 or more and 30 or less.

14. The metal particle annular structure (C) according to claim 2, wherein a number of the plurality of metal particles (A) is 3 or more and 30 or less.

15. The metal particle annular structure (C) according to claim 1, wherein the plurality of metal particles (A) have an average diameter of 5 nm or more and 200 nm or less.

16. The metal particle annular structure (C) according to claim 2, wherein the plurality of metal particles (A) have an average diameter of 5 nm or more and 200 nm or less.

17. The metal particle annular structure (C) according to claim 3, wherein the plurality of metal particles (A) have an average diameter of 5 nm or more and 200 nm or less.

18. The metal particle annular structure (C) according to claim 1, wherein the plurality of particles in the insulative support (B) are connected to one another through at least one of an interaction selected from a group consisting of a Coulomb interaction, a van der Waals interaction, a covalent bond and a hydrogen bond.

19. The metal particle annular structure (C) according to claim 1, wherein the metal particles (A) and the insulative support (B) have an interaction with each other which is at least one selected from a hydrogen bond, a covalent bond a van der Waals force interaction and a Coulomb force interaction.

20. A coating agent comprising the composition according to claim 12.

21. A metamaterial structure comprising the structure (C) according to claim 1.

22. A metamaterial structure comprising a plurality of the insulator-coated metal particle annular structures (F) according to claim 11.

23. A metamaterial structure produced from the composition according to claim 12.

* * * * *